United States Patent [19]

Saegusa

[11] Patent Number: 5,286,961
[45] Date of Patent: Feb. 15, 1994

[54] BAR CODE READER PRODUCING TWO GROUPS OF VERTICAL SCAN LINES AND TWO GROUPS OF INCLINED SCAN LINES ON A PLANE NORMAL TO THE READ WINDOW

[75] Inventor: Shinji Saegusa, Numazu, Japan

[73] Assignee: Tokyo Electric Co., Ltd., Tokyo, Japan

[21] Appl. No.: 890,289

[22] Filed: May 26, 1992

Related U.S. Application Data

[63] Continuation of Ser. No. 702,778, May 17, 1991, abandoned.

[30] Foreign Application Priority Data

May 23, 1990 [JP] Japan .................................. 2-131269
Mar. 20, 1991 [JP] Japan .................................. 3-056789

[51] Int. Cl.$^5$ ............................................. G06K 7/10
[52] U.S. Cl. .................................. 235/467; 359/216; 359/219
[58] Field of Search ................ 235/462, 467; 250/235, 250/236; 350/6.1, 6.5, 6.7, 6.9; 359/197, 212, 216, 217, 219

[56] References Cited

U.S. PATENT DOCUMENTS

| 4,766,298 | 8/1988 | Meyers | 235/467 X |
| 4,795,224 | 1/1989 | Goto | 350/6.3 |
| 4,816,661 | 3/1989 | Krichever et al. | 235/472 |
| 4,848,862 | 7/1989 | Yamazaki | 359/17 |
| 5,000,529 | 3/1991 | Katoh et al. | 235/467 X |
| 5,229,588 | 7/1993 | Detwiler et al. | 235/467 |

FOREIGN PATENT DOCUMENTS

| 0263696 | 4/1988 | European Pat. Off. | |
| 2420793 | 10/1979 | France | |
| 54-33739 | 3/1979 | Japan | 350/6.7 |
| 54-33740 | 3/1979 | Japan | 350/6.7 |
| 54-122930 | 9/1979 | Japan | 250/235 |

Primary Examiner—Davis L. Willis
Assistant Examiner—Edward H. Sikorski
Attorney, Agent, or Firm—Frishauf, Holtz, Goodman & Woodward

[57] ABSTRACT

In a bar code reading apparatus, a laser beam emitted from a laser beam source disposed in a casing is reflected by a rotational mirror to scan a bar code. The reflected laser beam is reflected by a fixed scan mirror having four mirror members continually arranged with given angles therebetween, and the resultant beams are irradiated outward through a read window formed in the casing. Multiple scan lines in multiple directions are obtained on a normal plane to the read window. These scan lines consist of two groups of vertical scan lines in the normal plane, and two groups of oblique scan lines inclined at a given angle with respect to the horizontal direction.

8 Claims, 8 Drawing Sheets

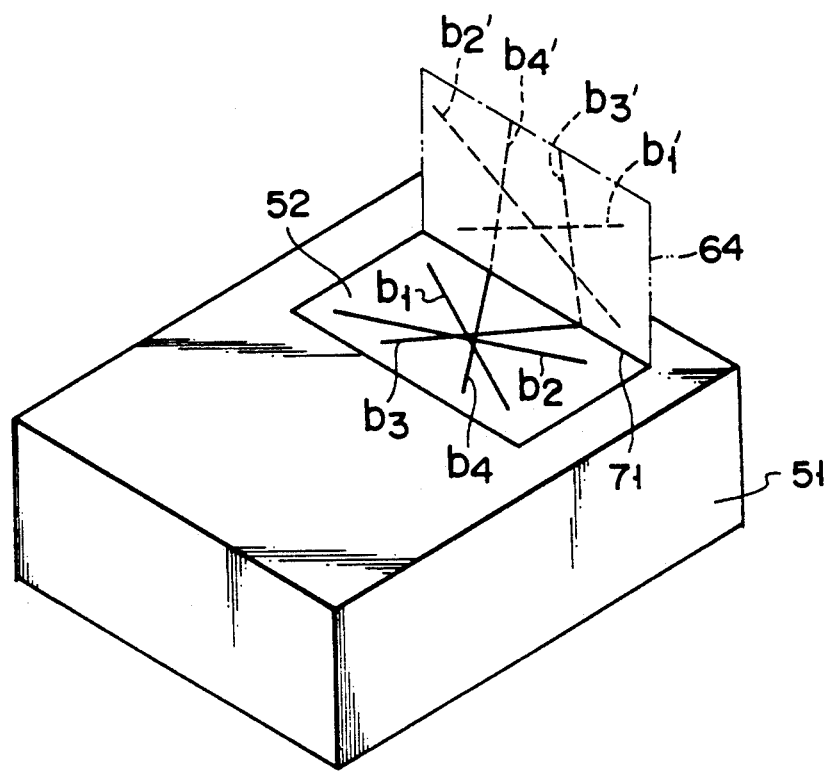
FIG. 6
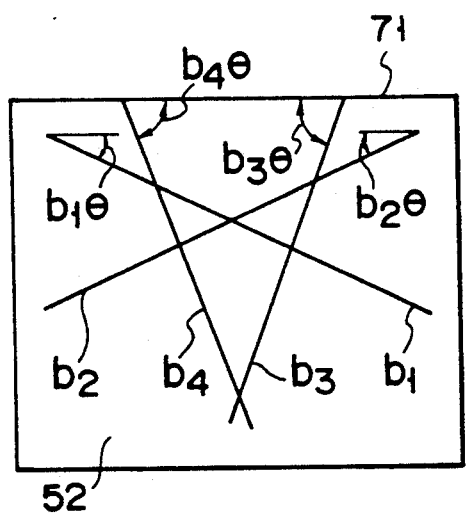  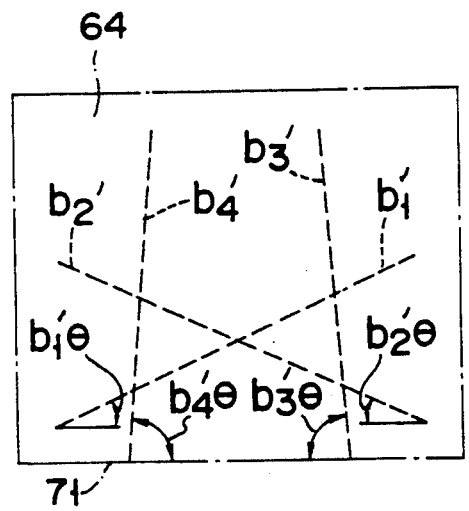
FIG. 7A  FIG. 7B

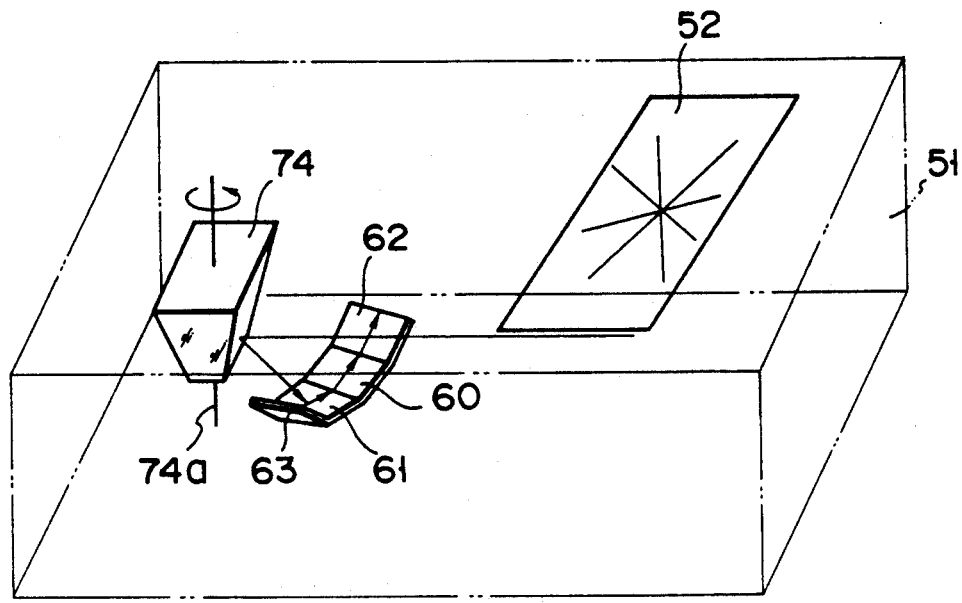
F I G. 14
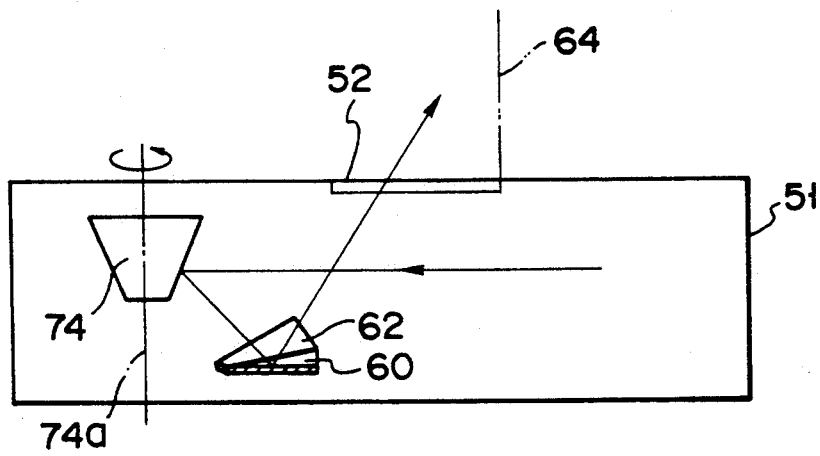
F I G. 15

BAR CODE READER PRODUCING TWO GROUPS OF VERTICAL SCAN LINES AND TWO GROUPS OF INCLINED SCAN LINES ON A PLANE NORMAL TO THE READ WINDOW

This application is a continuation of application Ser. No. 07/702,778, filed May 17, 1991, now abandoned.

BACKGROUND OF THE INVENTION

1. Field of the Invention

The present invention relates to a bar code reading apparatus which emits a laser beam for scanning a normal plane to the plane of a read window in multiple directions outward from the read window and reads out a bar code moving outside the read window.

2. Description of the Related Art

According to conventional bar code reading apparatuses, particularly, those of a counter type, generally a laser beam emitted from a laser beam source disposed in the casing enters a converging lens, after reflected by multiple optical-path change mirrors, to be converged into a small beam spot at a predetermined focus position. Then, the laser beam scans a given object while simultaneously being reflected by a rotational scan mirror, and is then reflected by a plurality of fixed scan mirrors, thus becoming multiple scan beams, which are in turn irradiated outward from the read window. Conventionally, the scan beams are normally emanated as five groups of beams, and when any one of the beams crosses the bar code affixed to an object moving outside the read window, modulated reflection light produced there enters a light-receiving lens through the same path as used for emission of the laser beam, and is then received at a light-receiving element.

According to the above conventional bar code reading apparatus, as disclosed in, for example, U.S. Pat. No. 4,799,164 and U.S. Pat. No. 4,861,973, there are five groups of scan beams which appear on the read window and the normal plane. Referring to FIG. 1, there are five groups of scan beams which appear on a read window plane 13 and a normal plane 14: one group consisting of horizontal scan beams $B_{1H}$ and $B_{1V}$, two groups including oblique scan beams $B_{2H}$, $B_{2V}$, $B_{3H}$ and $B_{3V}$, and two more groups having vertical scan beams $B_{4H}$, $B_{4V}$, $B_{5H}$ and $B_{5V}$. Each group of scan beams consists of two approximately parallel scan beams since the rotational scan mirror has two reflecting surfaces formed at slightly different angles. For the five groups of scan beams, therefore, there are ten scan beams produced. As the optical system uses many optical components, such as mirrors and lenses, the bar code reading apparatus inevitably becomes large, resulting in an increased manufacturing cost.

There is known a conventional bar code reading apparatus designed to be compact as disclosed in Published Unexamined Japanese Patent Application No. 64-48017, and this apparatus has a structure as shown in FIGS. 2 and 3.

According to this type of bar code reading apparatus, as shown in FIG. 2, a laser beam from a laser beam source 21 travels through a collimation 22, is reflected by optical-path change mirrors 23 and 24, passes a hole 25a of a perforated lens 25, and is reflected by a polygon rotational mirror 26 for scanning. The scan laser beam is reflected by a single fixed horizontal scan mirror 27 to become a group of horizontal scan beams, which are in turn emitted outside through a read window 30. The scan laser beam is also reflected by two fixed oblique scan mirrors $28_1$ and $28_2$, becoming two groups of oblique scan beams, which are also irradiated outside through the read window 30. The scan laser beam is further reflected by two fixed vertical scan mirrors $29_1$ and $29_2$, providing two groups of vertical scan beams, which in turn leave outside through the read window 30.

As the scan beams acquired by reflection at the polygon rotational mirror 26 are reflected once by the respective fixed scan mirrors 27, $28_1$, $28_2$, $29_1$ and $29_2$ to provide scan beams traveling in the respective directions, the number of optical components is reduced, thus contributing to realizing the bar code reading apparatus compact and reducing its manufacturing cost.

It is known that the longer the scan lines or the shorter the time to produce a series of scan lines, the better or higher the reading performance of this type of bar code reading apparatus.

Since the length of the scan lines is proportional to the distance to a bar code from the scan center of the polygon rotational mirror, however, it is difficult to make the scan lines longer for the conventional compact bar code reading apparatus. The time to produce a series of scan lines can of course be shortened by increasing the rotational velocity of the polygon rotational mirror. However, this method also increases the linear velocity of the scan beams, so that a decoder for decoding binary information acquired from the output of a light-receiving element, which receives reflection light from the bar code, cannot follow the increased speed. In this respect, shortening the time to generate a series of scan lines is limited.

In short, it is difficult to enhance the reading performance the conventional compact bar code reading apparatus.

SUMMARY OF THE INVENTION

It is therefore an object of the present invention to provide a bar code reading apparatus which overcomes the aforementioned conventional shortcomings, is designed compact at a low cost and can improve its reading performance.

To achieve this object, there is provided a bar code reading apparatus comprising laser beam source means, disposed in a casing having a read window through which a laser beam is to be irradiated outward, for emanating a laser beam; rotational mirror means for reflecting the laser beam emitted from the laser beam source means for scanning with the laser beam; and fixed scan mirror means disposed between the rotational mirror means and the read window and having four mirror members arranged continually at given angles therebetween in such a way as to provide multiple scan lines in multiple directions on a normal plane with respect to a plane of said read window from said laser beam reflected from said rotational mirror means, said multiple scan lines including two groups of vertical scan lines on said normal plane and two groups of oblique scan lines inclined at an angle with respect to a horizontal direction.

With the above structure, the bar code reading apparatus of the present invention can read a bar code even in four groups of scan areas with the same bar-code reading performance as acquired in the case of five scan areas of the conventional apparatus. This feature can reduce the number of required optical components as well as can make the overall apparatus compact.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a pattern diagram showing scan beams acquired by the plane of the read window and the normal plane of the bar code reading apparatus of the present invention;

FIG. 7A is a diagram illustrating angles defined by scan beams acquired by the read window plane and the intersecting line between the read window plane and the normal plane both shown in FIG. 6;

FIG. 7B is a diagram illustrating angles defined by scan beams acquired by the normal plane and the intersecting line between the read window plane and the normal plane both shown in FIG. 6;

FIG. 14 is a perspective view illustrating the structures of internal essential portions of a bar code reading apparatus according to another embodiment of the present invention; and FIG. 15 is a diagram for explaining a laser beam path shown in FIG. 14.

DETAILED DESCRIPTION OF THE PREFERRED EMBODIMENTS

Preferred embodiments of the present invention will now be described referring to the accompanying drawings.

Figure 1:
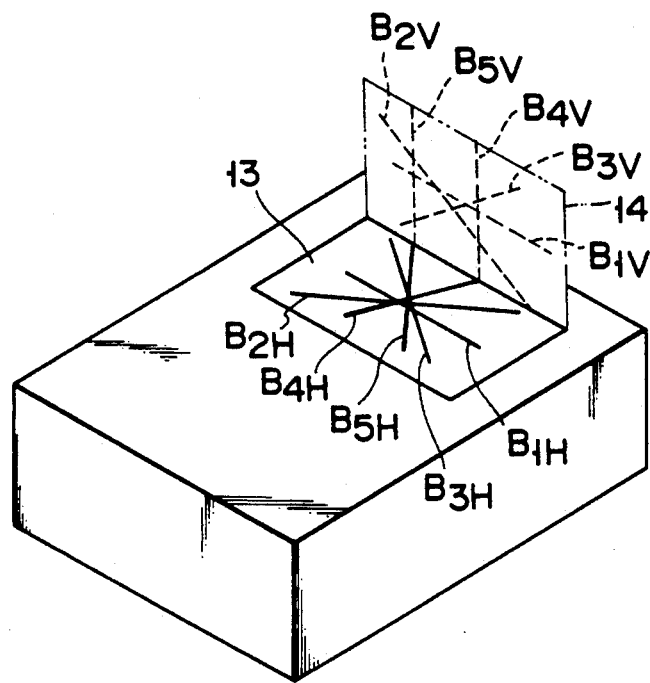
FIG. 1 is a diagram illustrating a conventional scan pattern that provides five groups of scan lines.
Figure 2:
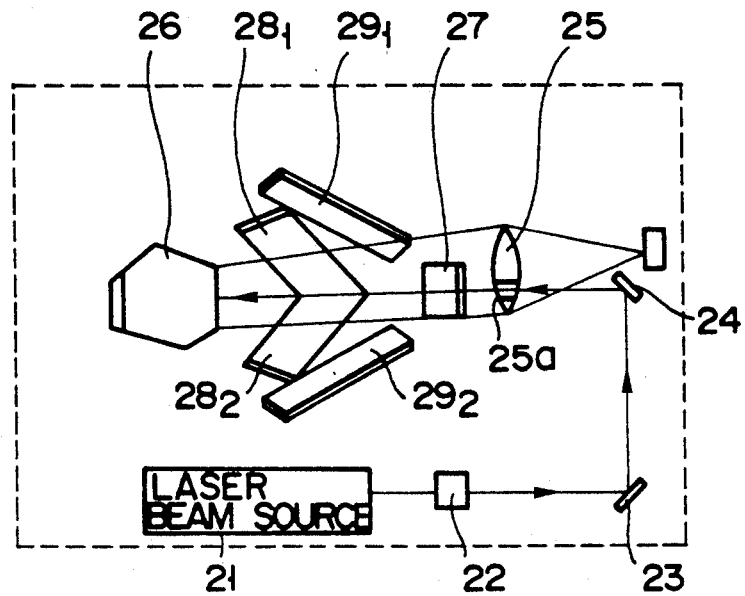
FIG. 2 is a plan view showing one embodiment of the conventional bar code reading apparatus.
Figure 3:
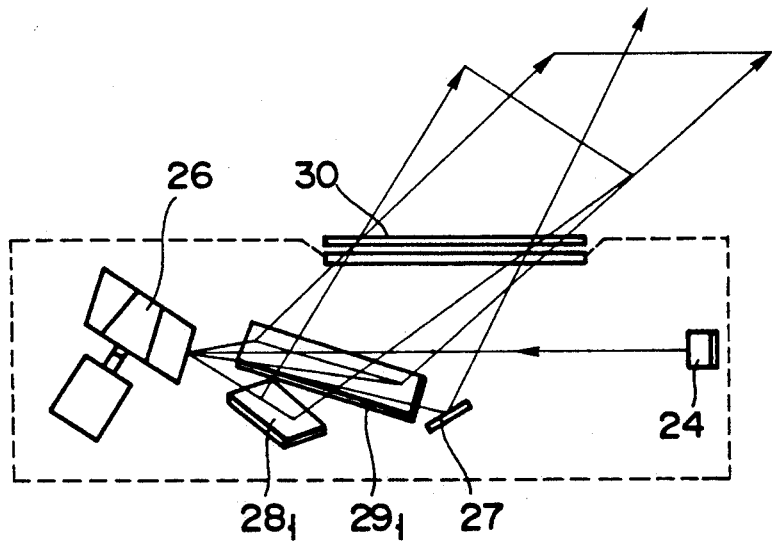
FIG. 3 is a side view of the apparatus shown in FIG. 2.
Figure 4:
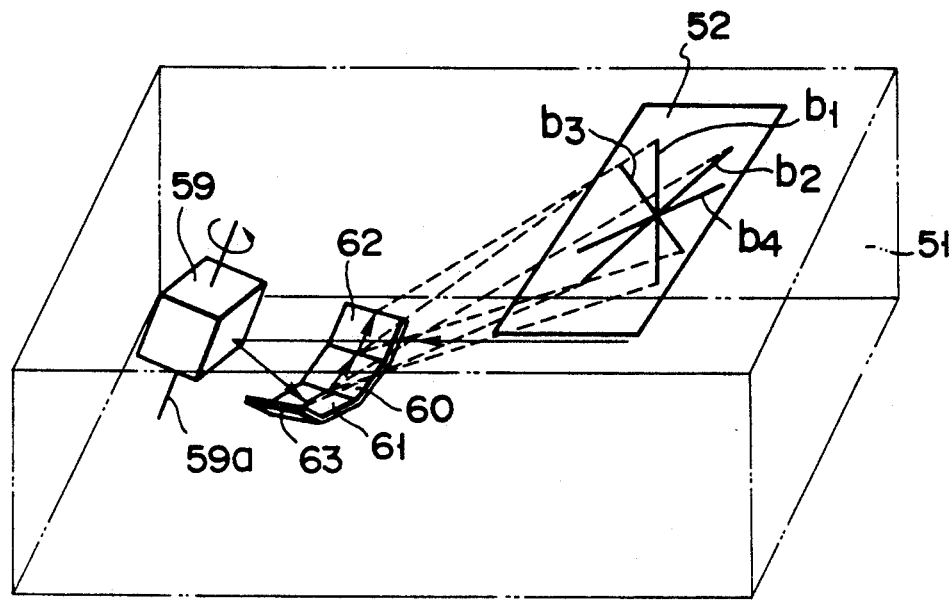
FIG. 4 is a perspective view illustrating a read window and the structures of essential portions of a bar code reading apparatus according to one embodiment of the present invention.
Figure 5:
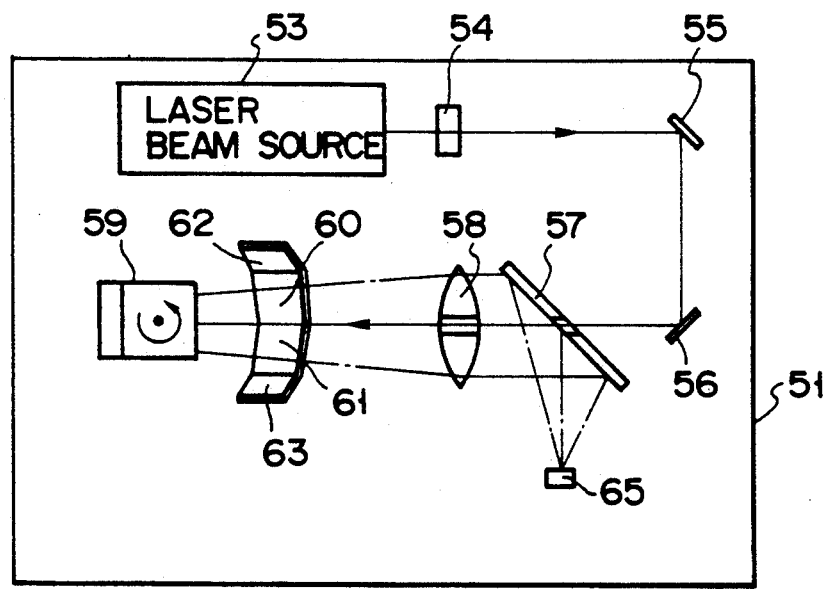
FIG. 5 is a diagram showing the layout of the internal components of the bar code reading apparatus according to the present invention.

As shown in FIGS. 4 and 5, a read window 52 is provided on the top of a casing 51. In the casing 51 are disposed a laser beam source 53, a converging optical system 54, an optical-path change mirrors 55 and 56, a perforated mirror 57, a perforated lens 58, and a rotational scan mirror 59. The laser beam source 53 emits a laser beam. The converging optical system 54 converges the laser beam from the laser beam source 53. The optical-path change mirrors 55 and 56 change the optical path of the converged laser beam. The perforated mirror 57 and perforated lens 58 permit the laser beam, coming from the optical-path change mirrors 55 and 56, to pass through holes formed in their center portions. The rotational scan mirror 59 reflect the laser beam having passed through this perforated lens 58 and scans with the laser beam.

The rotational scan mirror 59 is designed to be a polygonal prism, for example, quadratic prism, with a rotational center axis 59a having its upper portion tilted in the casing 51 in the direction of a normal plane with respect to the read window 52 (i.e., a plane normal to the read window) toward where the read window 52 is provided. The mirror 59 reflects an incident laser beam in the opposite direction to the top side of the casing 51 where the read window 52 is provided or obliquely downward to scan with it. The individual sides of the mirror 59 have slightly different inclination angles in order to acquire approximately parallel four scan lines in each scan line group.

Four fixed scan mirrors 60, 61, 62 and 63 are arranged at a lower portion in the casing 51 to receive the reflection beam from the rotational scan mirror 59.

The fixed scan mirrors 60–63 reflect the reflection beam from the rotational scan mirror 59 to produce four groups of laser beams which scan in four directions outward through the read window 52 toward the normal plane to the read window plane. The fixed scan mirrors 60 and 61 produce two groups of oblique scan lines $b_1'$ and $b_2'$ while the fixed scan mirrors 62 and 63 provide two groups of nearly vertical scan lines $b_3'$ and $b_4'$ as shown in FIG. 6.

The fixed scan mirrors 60 and 61 are arranged as shown in FIG. 4 in such a way that the oblique scan lines $b_1$ and $b_2$ will have relatively obtuse angles to the horizontal direction on the normal plane 64 as shown in FIG. 6. The fixed scan mirrors 62 and 63 are arranged as shown in FIG. 4 so that the nearly vertical scan lines $b_3'$ and $b_4'$ will become approximately perpendicular to the normal plane 64 as shown in FIG. 6. In other words, those fixed scan mirrors 60–63 are arranged so that four groups of scan lines $b_1$ to $b_4$ in the plane of the read window 52 become $b_1'$, $b_2'$, $b_3'$ and $b_4'$ on the normal plane 64.

Since, according to this embodiment, the rotational scan mirror 59 having a shape of a quadratic prism with four sides having slightly different inclination angles is used, each scan line group consists of four nearly parallel scan beams, so that the optical system of this embodiment provides sixteen scan beams in total.

Reflection light obtained by reflection of the scan beams at a bar code outside the read window 52 is received by a light-receiving element 65 after passing through the fixed scan mirrors 60-63, the rotational scan mirror 59, the perforated lens 58 and the perforated mirror 57 in the named order, and is supplied to signal processing circuits, such as an A/D converter, shading compensator and decoder, located at the subsequent stage of the element 65 (see FIG. 5).

According to this embodiment with the above-described structure, as shown in FIG. 5, the laser beam from the laser beam source 53 is converged by the converging optical system 54, and is sent through the holes of the perforated mirror 57 and the perforated lens 58 to the rotational scan mirror 59 after the optical path of the converged beam is changed by the optical-path change mirrors 55 and 56. The laser beam reflected by the rotational scan mirror 59 is further reflected by the underlying four fixed scan mirrors 60-63, and the resultant beams are irradiated outward through the read window 52.

Given that angles defined by the individual scan groups $b_1$, $b_2$, $b_3$ and $b_4$ on the plane of the read window 52 and an intersecting line 71 between the read window 52 and the normal plane 64 to the window in FIG. 6 are respectively $b_1\theta$, $b_2\theta$, $b_3\theta$ and $b_4\theta$ as shown in FIG. 7A and that angles defined by the individual scan groups $b_1'$, $b_2'$, $b_3'$ and $b_4'$ on the normal plane 64 and the intersecting line 71 are respectively $b_1'\theta$, $b_2'\theta$, $b_3'\theta$ and $b_4'\theta$ as shown in FIG. 7B, it is proved from a theoretical analysis and the results of experiments that the optimal range for the angles are as given in Table 1 below.

TABLE 1

| Angles On Read Plane | Angles On Normal Plane |
|---|---|
| $b_1\theta = 15\sim30°$ | $b_1'\theta = 15\sim30°$ |
| $b_2\theta = -b_1\theta$ | $b_2'\theta = -b_1'\theta$ |
| $b_3\theta = 60\sim80°$ | $b_3'\theta = 80\sim100°$ |
| $b_4\theta = -b_3\theta$ | $b_4'\theta = -b_3'\theta$ |

According to the present invention, since groups of scan lines are produced by a single reflection of the laser beam from the rotational scan mirror 59 at the fixed scan mirrors 60-63, generally, the freedom of producing scan lines becomes narrower, which may make it difficult to realize the ranges of the desired angles of the scan lines as shown in Table 1. Actually, however, if the scan line angles are within the ranges shown in Table 2 below, no problem would arise on the reading performance.

TABLE 2

| Angles On Read Plane | Angles On Normal Plane |
|---|---|
| $b_1\theta = 15\sim30°$ | $b_1'\theta = 15\sim40°$ |
| $b_2\theta = -b_1\theta$ | $b_2'\theta = -b_1'\theta$ |
| $b_3\theta = 55\sim80°$ | $b_3'\theta = 80\sim105°$ |
| $b_4\theta = -b_3\theta$ | $b_4'\theta = -b_3'\theta$ |

The aforementioned theoretical analysis and experiments will now be discussed in more detail.

In general, evaluation of the reading performance based on the number of effective scans is widely used as a theoretical analysis to evaluate the reading performance of a bar code scanner.

Figure 8:
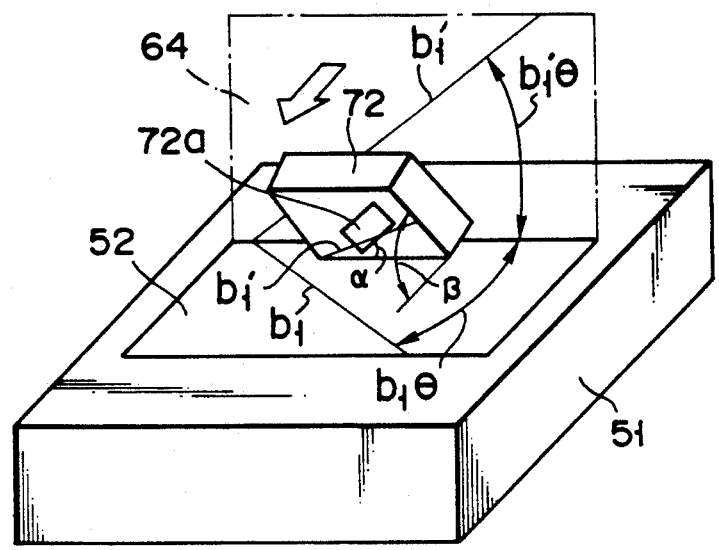
FIG. 8 is a diagram showing the elevation angle of an object and the rotational angle of a bar code, which are involved in calculating the number of effective scans to evaluate the reading performance.

Referring to FIG. 8, this is a method which limits the freedom of an object 72 moving in the arrow direction in this diagram only to an elevation angle $\beta$ and a rotational angle of a bar code 72a, $\alpha$, with the read window 52 as a reference, and computes the number of times the bar code effectively crosses the scan lines (the number of effective scans) during a sequence of reading operations to evaluate the reading performance. The results of the analysis using this method are exemplified in Tables 3, 4 and 5. Although FIG. 8 illustrates a single oblique scan group ($b_1$, $b_1'$) for diagrammatic simplicity, this analysis acquires the total number of effective scans for all the scan lines (four scan lines per group amounting to sixteen scan lines for four groups in this embodiment), and Tables 3 to 5 show the results of the analysis in the case where a standard upc code, which is not truncated (i.e., the height of the bar code are not reduced), is moved on the window 52 at a speed of 2.54 m per second.

TABLE 3

Label Width: 18.81 mm, Label Height: 22.86 mm, Moving Speed: 2.54 m/s

| β | α | | | | | | | | | | | | | | | | | | |
|---|---|---|---|---|---|---|---|---|---|---|---|---|---|---|---|---|---|---|---|
| | 0° | 5° | 10° | 15° | 20° | 25° | 30° | 35° | 40° | 45° | 50° | 55° | 60° | 65° | 70° | 75° | 80° | 85° | 90° |
| 90° | 3 | 3 | 3 | 3 | 3 | 3 | 4 | 4 | 4 | 5 | 5 | 6 | 6 | 7 | 8 | 8 | 9 | 9 | 9 |
| 85° | 4 | 4 | 4 | 4 | 4 | 4 | 4 | 4 | 4 | 5 | 5 | 6 | 6 | 7 | 8 | 8 | 8 | 9 | 9 |
| 80° | 5 | 4 | 4 | 4 | 4 | 4 | 4 | 4 | 4 | 5 | 5 | 6 | 6 | 7 | 7 | 8 | 8 | 9 | 9 |
| 75° | 5 | 5 | 5 | 4 | 4 | 5 | 5 | 5 | 5 | 5 | 5 | 6 | 6 | 7 | 7 | 8 | 8 | 8 | 8 |
| 70° | 6 | 5 | 5 | 5 | 5 | 5 | 5 | 5 | 5 | 5 | 5 | 6 | 6 | 7 | 7 | 8 | 8 | 8 | 8 |
| 65° | 6 | 6 | 5 | 5 | 5 | 5 | 5 | 5 | 5 | 5 | 5 | 6 | 6 | 7 | 7 | 8 | 8 | 8 | 8 |
| 60° | 6 | 6 | 6 | 6 | 5 | 5 | 6 | 6 | 6 | 5 | 5 | 6 | 6 | 7 | 7 | 8 | 8 | 7 | 7 |
| 55° | 7 | 6 | 6 | 6 | 5 | 5 | 6 | 6 | 6 | 6 | 5 | 6 | 6 | 7 | 7 | 8 | 7 | 7 | 7 |
| 50° | 7 | 6 | 6 | 6 | 5 | 6 | 6 | 6 | 6 | 6 | 6 | 6 | 6 | 7 | 7 | 7 | 7 | 7 | 7 |
| 45° | 7 | 6 | 6 | 6 | 5 | 6 | 7 | 7 | 7 | 6 | 6 | 6 | 6 | 7 | 7 | 7 | 7 | 6 | 6 |
| 40° | 7 | 6 | 6 | 6 | 6 | 6 | 7 | 7 | 7 | 6 | 6 | 6 | 6 | 7 | 7 | 7 | 6 | 6 | 6 |
| 35° | 7 | 6 | 6 | 6 | 6 | 6 | 7 | 7 | 7 | 7 | 6 | 6 | 6 | 7 | 7 | 6 | 6 | 6 | 6 |
| 30° | 6 | 6 | 6 | 5 | 6 | 6 | 7 | 7 | 7 | 7 | 7 | 7 | 7 | 7 | 6 | 6 | 5 | 5 | 5 |
| 25° | 6 | 6 | 6 | 5 | 6 | 6 | 7 | 7 | 7 | 7 | 7 | 7 | 7 | 6 | 6 | 6 | 5 | 5 | 5 |
| 20° | 6 | 6 | 5 | 5 | 6 | 6 | 7 | 7 | 7 | 7 | 7 | 7 | 7 | 6 | 6 | 5 | 5 | 5 | 5 |
| 15° | 5 | 5 | 5 | 5 | 6 | 6 | 7 | 7 | 7 | 7 | 7 | 7 | 7 | 6 | 6 | 5 | 5 | 5 | 5 |
| 10° | 5 | 5 | 4 | 5 | 5 | 6 | 7 | 7 | 7 | 7 | 7 | 7 | 7 | 6 | 6 | 5 | 5 | 5 | 5 |
| 5° | 4 | 4 | 4 | 4 | 5 | 6 | 6 | 7 | 7 | 7 | 7 | 7 | 7 | 6 | 6 | 5 | 5 | 5 | 5 |
| 0° | 4 | 3 | 3 | 4 | 5 | 5 | 6 | 7 | 7 | 7 | 7 | 7 | 7 | 6 | 6 | 5 | 5 | 5 | 5 |

TABLE 4

Label Width: 18.81 mm, Label Height: 22.86 mm, Moving Speed: 2.54 m/s

| β \ α | 0° | 5° | 10° | 15° | 20° | 25° | 30° | 35° | 40° | 45° | 50° | 55° | 60° | 65° | 70° | 75° | 80° | 85° | 90° |
|---|---|---|---|---|---|---|---|---|---|---|---|---|---|---|---|---|---|---|---|
| 90° | 1 | 1 | 1 | 1 | 2 | 2 | 2 | 3 | 4 | 4 | 5 | 6 | 6 | 7 | 8 | 8 | 9 | 9 | 9 |
| 85° | 1 | 1 | 1 | 2 | 2 | 2 | 3 | 3 | 4 | 4 | 5 | 6 | 6 | 7 | 8 | 8 | 8 | 9 | 9 |
| 80° | 2 | 2 | 2 | 2 | 2 | 3 | 3 | 3 | 4 | 4 | 5 | 6 | 6 | 7 | 7 | 8 | 8 | 9 | 9 |
| 75° | 2 | 2 | 2 | 2 | 2 | 3 | 3 | 3 | 4 | 4 | 5 | 6 | 6 | 7 | 7 | 8 | 8 | 8 | 8 |
| 70° | 2 | 2 | 2 | 2 | 3 | 3 | 3 | 4 | 4 | 4 | 5 | 6 | 6 | 7 | 7 | 8 | 8 | 8 | 8 |
| 65° | 3 | 3 | 3 | 2 | 3 | 3 | 4 | 4 | 4 | 5 | 5 | 6 | 6 | 7 | 7 | 8 | 8 | 8 | 8 |
| 60° | 3 | 3 | 3 | 3 | 3 | 3 | 4 | 5 | 5 | 5 | 5 | 6 | 6 | 7 | 7 | 8 | 8 | 7 | 7 |
| 55° | 3 | 3 | 3 | 3 | 3 | 3 | 4 | 5 | 5 | 5 | 5 | 6 | 6 | 7 | 7 | 8 | 7 | 7 | 7 |
| 50° | 3 | 3 | 3 | 3 | 3 | 4 | 5 | 5 | 5 | 6 | 6 | 6 | 6 | 7 | 7 | 7 | 7 | 7 | 7 |
| 45° | 3 | 3 | 3 | 3 | 3 | 4 | 5 | 5 | 6 | 6 | 6 | 6 | 6 | 7 | 7 | 7 | 7 | 6 | 6 |
| 40° | 3 | 3 | 3 | 3 | 3 | 4 | 5 | 6 | 6 | 6 | 6 | 6 | 6 | 7 | 7 | 7 | 6 | 6 | 6 |
| 35° | 3 | 3 | 3 | 3 | 3 | 4 | 4 | 6 | 6 | 6 | 6 | 6 | 6 | 7 | 7 | 6 | 6 | 6 | 6 |
| 30° | 3 | 3 | 3 | 3 | 3 | 4 | 5 | 6 | 6 | 6 | 7 | 7 | 7 | 7 | 7 | 6 | 6 | 6 | 5 |
| 25° | 3 | 3 | 3 | 3 | 4 | 5 | 5 | 6 | 6 | 7 | 7 | 7 | 7 | 7 | 6 | 6 | 6 | 5 | 5 |
| 20° | 2 | 2 | 2 | 3 | 4 | 5 | 5 | 6 | 7 | 7 | 7 | 7 | 7 | 7 | 6 | 6 | 6 | 5 | 5 |
| 15° | 2 | 2 | 2 | 2 | 3 | 4 | 5 | 6 | 7 | 7 | 7 | 7 | 7 | 7 | 6 | 6 | 5 | 5 | 5 |
| 10° | 2 | 2 | 2 | 2 | 3 | 4 | 5 | 6 | 7 | 7 | 7 | 7 | 7 | 7 | 6 | 6 | 5 | 5 | 5 |
| 5° | 1 | 1 | 1 | 2 | 3 | 4 | 5 | 6 | 7 | 7 | 7 | 7 | 7 | 7 | 6 | 6 | 5 | 5 | 5 |
| 0 | 1 | 1 | 1 | 2 | 3 | 4 | 5 | 6 | 7 | 7 | 7 | 7 | 7 | 7 | 6 | 6 | 5 | 5 | 5 |

TABLE 5

Label Width: 18.81 mm, Label Height: 22.86 mm, Moving Speed: 2.54 m/s

| β \ α | 0° | 5° | 10° | 15° | 20° | 25° | 30° | 35° | 40° | 45° | 50° | 55° | 60° | 65° | 70° | 75° | 80° | 85° | 90° |
|---|---|---|---|---|---|---|---|---|---|---|---|---|---|---|---|---|---|---|---|
| 90° | 4 | 4 | 4 | 4 | 4 | 3 | 3 | 2 | 3 | 4 | 6 | 8 | 10 | 11 | 13 | 14 | 16 | 18 | 18 |
| 85° | 4 | 4 | 4 | 4 | 4 | 3 | 3 | 2 | 3 | 4 | 6 | 8 | 10 | 11 | 13 | 14 | 16 | 18 | 18 |
| 80° | 5 | 5 | 5 | 5 | 4 | 3 | 3 | 3 | 3 | 4 | 6 | 8 | 10 | 11 | 13 | 14 | 16 | 17 | 18 |
| 75° | 5 | 5 | 5 | 5 | 5 | 4 | 3 | 3 | 4 | 5 | 6 | 8 | 10 | 11 | 13 | 14 | 16 | 17 | 17 |
| 70° | 6 | 6 | 6 | 6 | 5 | 4 | 3 | 4 | 4 | 5 | 6 | 8 | 9 | 11 | 13 | 14 | 16 | 17 | 17 |
| 65° | 6 | 6 | 6 | 6 | 5 | 4 | 4 | 4 | 5 | 5 | 6 | 8 | 9 | 11 | 13 | 14 | 16 | 16 | 16 |
| 60° | 6 | 6 | 6 | 6 | 5 | 5 | 4 | 4 | 5 | 5 | 6 | 8 | 9 | 11 | 13 | 14 | 16 | 16 | 16 |
| 55° | 7 | 7 | 6 | 6 | 6 | 5 | 5 | 5 | 5 | 6 | 6 | 8 | 9 | 11 | 13 | 14 | 15 | 15 | 15 |
| 50° | 7 | 7 | 7 | 6 | 6 | 5 | 5 | 5 | 5 | 6 | 7 | 8 | 9 | 11 | 13 | 14 | 15 | 15 | 15 |
| 45° | 7 | 7 | 7 | 6 | 6 | 5 | 5 | 5 | 6 | 6 | 7 | 8 | 9 | 11 | 13 | 14 | 15 | 15 | 15 |
| 40° | 7 | 7 | 7 | 6 | 6 | 5 | 5 | 5 | 6 | 7 | 7 | 8 | 9 | 11 | 13 | 14 | 14 | 14 | 14 |
| 35° | 7 | 7 | 7 | 8 | 6 | 5 | 5 | 6 | 6 | 7 | 7 | 8 | 9 | 11 | 12 | 14 | 14 | 14 | 14 |
| 30° | 6 | 6 | 6 | 6 | 6 | 5 | 6 | 6 | 6 | 7 | 7 | 8 | 8 | 11 | 12 | 13 | 14 | 14 | 14 |
| 25° | 6 | 6 | 6 | 6 | 5 | 5 | 6 | 6 | 6 | 7 | 8 | 8 | 9 | 11 | 12 | 13 | 14 | 14 | 14 |
| 20° | 6 | 6 | 6 | 6 | 5 | 5 | 6 | 6 | 6 | 7 | 8 | 8 | 9 | 11 | 12 | 13 | 13 | 14 | 14 |
| 15° | 6 | 6 | 5 | 5 | 5 | 5 | 5 | 6 | 6 | 7 | 8 | 8 | 9 | 11 | 12 | 13 | 13 | 13 | 13 |
| 10° | 5 | 5 | 5 | 5 | 5 | 5 | 5 | 6 | 6 | 7 | 8 | 8 | 9 | 11 | 12 | 13 | 13 | 13 | 13 |
| 5° | 5 | 5 | 5 | 5 | 5 | 5 | 5 | 6 | 6 | 7 | 8 | 8 | 9 | 11 | 12 | 13 | 13 | 13 | 13 |
| 0° | 4 | 4 | 4 | 4 | 4 | 4 | 5 | 6 | 6 | 7 | 8 | 8 | 9 | 11 | 12 | 13 | 13 | 13 | 13 |

The values in each table above indicate the number of effective scans when the rotational angle α is changed every 5° in the range of 0° to 90° while the elevation angle β is changed every 5° in the range of 0° to 90°. The greater the values, the better the reading performance. In general, with three or more effective scans, there would be no problem on the reading performance; however, with two or less effective-scans as indicated by the shaded areas in the above Tables 4 and 5, the reading may become difficult.

Table 3 presents the results of the analysis using the most typical, counter type bar code scanner involving five groups of scan lines, and shows that a good reading performance is secured over the entire ranges of 0° to 90° for both the rotational angle α of the bar code 72a and the elevation angle β of the object 72.

Table 4 presents the results of the analysis in the case where the counter type bar code scanner involving five groups of scan lines as used for Table 3 is used but the reading is executed with the horizontal scan group eliminated, i.e., with four groups of scan lines, and shows deterioration of the reading performance for the rotational angle of 20° or below.

Table 5 shows the results of the analysis using a bar code scanner involving four groups of scan lines according to one embodiment of the present invention, with the scan line angles as indicated in Table 1 or 2. It is apparent from this table that a high reading performance is maintained over the freedom range of the object 72 and the same reading performance as provided by the scanner using five groups of scan lines can be secured by four groups of scan lines if the arrangement of the scan lines is optimized.

To prove the above theoretical analysis, a test on reading bar codes by operators were conducted. In this test, the time for reading a single bar code sample was acquired from the time required for multiple operators to read predetermined multiple bar code samples, with 10000 readings done by each operator.

The test results show that the average reading times for the conventional, most typical bar code scanner using five groups of scan lines and the bar code scanner using four groups of scan lines according to the present embodiment with the scan line angles as specified by Table 1 or 2 are both approximately 0.94 sec per sample, no difference occurring in the reading performance.

Figure 9:
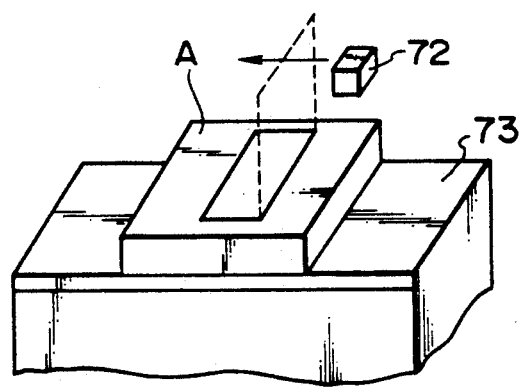
FIG. 9 is a perspective view of the bar code reading apparatus of the present invention as placed face up on a stand.
Figure 10:
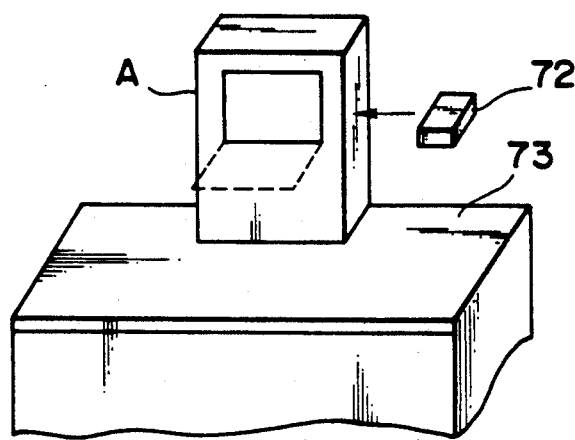
FIG. 10 is a perspective view of the bar code reading apparatus of the present invention as placed upright on a stand.

The above test was conducted with the present apparatus A placed face up on a sacker table 73 as shown in FIG. 9. The same test was conducted with the present apparatus A placed upright on the sacker table 73 as shown in FIG. 10, with an almost similar result that the average reading time of the bar code scanner using five groups of scan lines is 1.0 sec while the average reading time of the bar code scanner using four groups of scan lines according to this embodiment is 0.90 sec.

From the above, it is proved from experiments as well as the theoretical analysis that the reading performances of both bar code scanners show no substantial advantage and the same level of reading performance as providable by the conventional bar code scanner using five groups of scan lines can be secured with four groups of scan lines if the optimal scanning pattern is selected.

What is more, the scanner of this embodiment using four groups of scan lines can make the bar code reading apparatus significantly compact as compared with the conventional scanner using five groups of scan lines.

Figure 11:
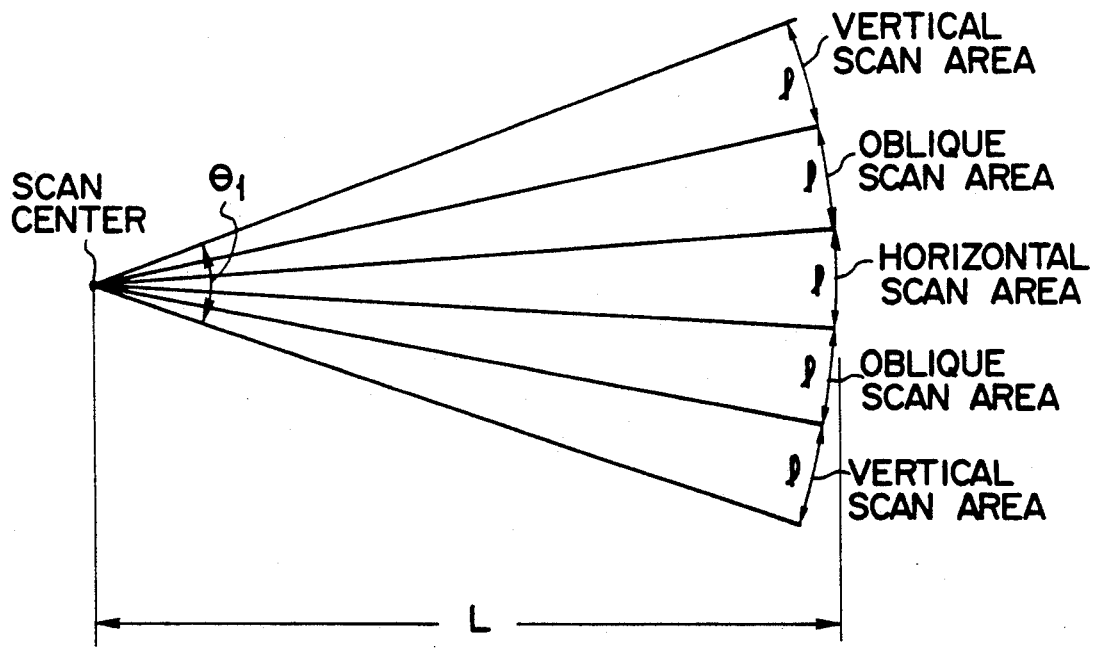
FIG. 11 is a diagram showing the relationship between the entire scan angle $\theta_1$, the distance L to the read window from the scan center, and individual scan line lengths l corresponding to five groups of scan areas in the case where five groups of scan lines are acquired.
Figure 12:
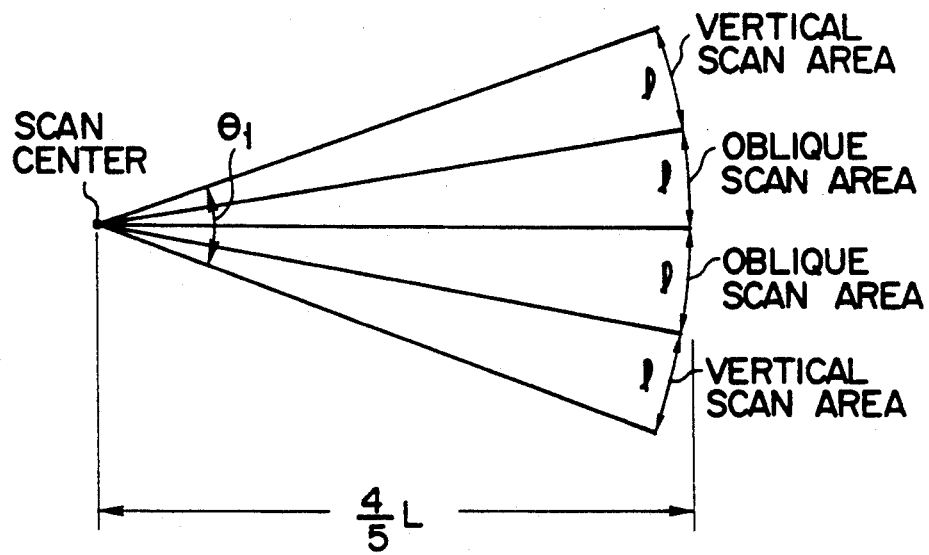
FIG. 12 is a diagram showing the relationship between individual scan line lengths l corresponding to four groups of scan areas and the distance L to the read window from the scan center in the case where the entire scan angle is set equal to the one, $\theta_1$, shown in FIG. 11.

For instance, given that for the type using five groups of scan areas, the distance to the read window from the scan center is L, the entire scan angle is $\theta_1$ and each scan line length l equals one fifth of the entire scan length as shown in FIG. 11, the distance to the read window from the scan center can be reduced to 4/5 of the conventional one without changing $\theta_1$ and l or without deteriorating the reading performance as shown in FIG. 12. This embodiment can therefore contribute to making the bar code reading apparatus significantly compact.

Figure 13:
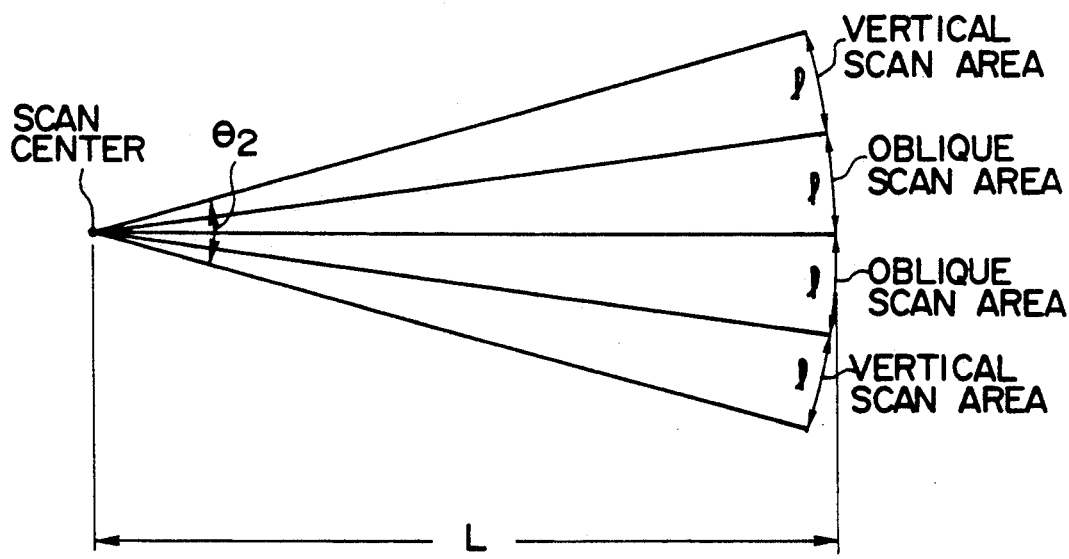
FIG. 13 is a diagram showing the relationship between individual scan line lengths l corresponding to four groups of scan areas and the entire scan angle $\theta_2$ in the case where the distance to the read window from the scan center is set equal to the one, L, shown in FIG. 11.

If the distance to the read window from the scan center is set equal to L, the same one as involved in the case of the five groups of scan areas, and each scan line length is also set equal to l, the entire scan angle can be reduced from $\theta_1$ to $\theta_2$ as shown in FIG. 13. This means that the time to produce a series of scan lines can be shortened without increasing the rotational speed of the rotational scan mirror 59 shown in FIG. 4, thus permitting the number of scan lines for each group to be increased and improving the performance of reading a bar code as a consequence.

Accordingly, the distance to the read window from the scan center can be made shorter than L while the entire scan angle can be made smaller than $\theta_1$, thus ensuring both compactness of the apparatus and improvement of the bar-code reading performance at the same time.

According to this embodiment, since the reflection beam from the rotational scan mirror 59 is reflected once at the fixed scan mirrors 60-63 to provide scan beams which are to be irradiated outward through the read window 52 and four groups of scan areas instead of five are used, the number of optical components can be reduced further than the conventional compact bar code reading apparatus. This feature contributes to realizing a compacter apparatus and reducing the manufacturing cost.

Although this embodiment employs a quadratic prism type rotational scan mirror, the rotational scan mirror is not limited to this particular type but other prisms having three sides or five or more sides may be used as well.

The quadratic prism may be replaced with a rotational scan mirror 74 with a polygonal pyramid shape as shown in FIGS. 14 and 15 with the same effect a acquired by the above-described embodiment. With the rotational scan mirror 74 having a polygonal pyramid shape, as the mirror surfaces of the rotational scan mirror face obliquely downward, the rotational axis 74a becomes approximately parallel to the direction of a line 64 normal to the read window.

The foregoing description of the embodiment has been given with reference to the case where two groups of oblique scan lines $b_1$ and $b_2$ ($b_1'$ and $b_2'$) and two groups of nearly vertical scan lines $b_3$ and $b_4$ ($b_3'$ and $b_4'$) are symmetrical patterns, respectively. However, there may be a case where asymmetrical patterns are desirable depending on the usage of the scanner, so that the scan line groups should not be limited to symmetrical patterns.

Additional advantages and modifications will readily occur to those skilled in the art. Therefore, the invention in its broader aspects is not limited to the specific details, and representative devices, and illustrated examples show and described herein. Accordingly, various modifications may be made without departing from the spirit or scope of the general inventive concept as defined by the appended claims and their equivalents.

What is claimed is:

1. A bar code reading apparatus comprising:

laser beam source means for emitting a laser beam, said laser beam source means being disposed in a casing, said casing having a horizontal read window through which a laser beam is to be irradiated outward;

rotational mirror means for reflecting said laser beam emitted from said laser beam source means, for scanning with said laser beam; and fixed scan mirror means disposed between said rotational mirror means and said horizontal read window for reflecting laser beams from said rotational mirror means to said horizontal read window, said fixed scan mirror means being fixed relative to said casing and consisting of four fixed mirror members arranged at given angles therebetween, said four fixed mirror members being arranged in such a manner that said laser beam reflected from said rotational mirror means provides four scan lines ($b_1$, $b_2$, $b_3$, $b_4$) in multiple directions on a plane of said horizontal read window and also four scan lines ($b'_1$, $b'_2$, $b'_3$, $b'_4$) in multiple directions on a normal plane which is normal to the plane of the horizontal read window, said four scan lines ($b_1$, $b_2$, $b_3$, $b_4$) on the plane of the horizontal read window and said four scan lines ($b'_1$, $b'_2$, $b'_3$, $b'_4$) on the normal plane having one-to-one correspondence, and constituting a first group of scan lines ($b_1$, $b_2$, $b'_1$, $b'_2$) and a second group of scan lines ($b_3$, $b_4$, $b'_3$, $b'_4$), one ($b_1$) of the two scan lines which are included in the first group and which are provided on the plane of the horizontal read window forming an angle of $b_1\theta$ (where $b_1\theta = 15°$ to 30°) with respect to an intersecting line between said plane of said horizontal read window and said normal plane, and the other one ($b_2$) of said two scan lines forming an angle of $b_2\theta$ (where $b_2\theta = -b_1\theta$) with respect to said intersecting line, one ($b'_1$) of the two scan lines which are included in the first group and which are provided on said normal plane forming an angle of $b'_1\theta$ (where $b'_1\theta = 15°$ to 40°) with respect to said intersecting line, and the other one ($b'_2$) of said two scan lines forming an angle of $b'_2\theta$ (where $b'_2\theta = -b'_1\theta$), one ($b'_3$) of the two scan lines which are included in the second group and which are provided on the plane of the horizontal read window forming an angle of $b_3\theta$ (where $b_3\theta = 55°$ to $80°$) with respect to said intersecting line, and the other one ($b_4$) of said two scan lines forming an angle of $b_4\theta$ (where $b_4\theta = -b_3\theta$), one ($b'_3$) of the two scan lines which are included in the second group and which are provided on said normal plane forming an angle of $b'_3\theta$ (where $b'_3\theta = 80°$ to $105°$) with respect to said intersecting line, and the other one ($b'_4$) of said two scan lines forming an angle of $b'_4\theta$ (where $b'_4\theta = -b'_3\theta$), the scan lines of the first group being provided by two of said four fixed mirror members, and the scan lines of the second group being provided by a different two of said four fixed mirror members.

2. A bar code reading apparatus according to claim 1, wherein said rotational mirror means has an inclined face for reflecting said laser beam from said laser beam source means toward a region inside of said casing which is opposite to a region of said casing in which said read window is disposed.

3. A bar code reading apparatus according to claim 1, wherein said rotational mirror means has a shape of a polygonal prism with a rotational center axis inclined with respect to a normal plane to said plane of said read window.

4. A bar code reading apparatus according to claim 1, wherein said rotational mirror means has a shape of a polygonal pyramid with a rotational axis approximately parallel to a normal plane to said plane of said read window.

5. A bar code reading apparatus according to claim 1, wherein said four fixed mirror members are connected to each other.

6. A bar code reading apparatus according to claim 5, wherein said four fixed mirror members are connected to each other so as to form a single unitary mirror unit.

7. A bar code reading apparatus according to claim 5, wherein said four fixed mirror members are arranged at respective different angular orientations in said casing.

8. A bar code reading apparatus according to claim 1, wherein said four fixed mirror members are arranged at respective different angular orientations in said casing.

* * * * *

UNITED STATES PATENT AND TRADEMARK OFFICE
CERTIFICATE OF CORRECTION

PATENT NO. : 5,286,961

DATED : February 15, 1994

INVENTOR(S) : SAEGUSA

It is certified that error appears in the above-identified patent and that said Letters Patent is hereby corrected as shown below:

Title page, Section [56] References Cited, under "U.S. PATENT DOCUMENTS"

insert: --4,799,164 1/1989 Hellekson et al....235/467
                 4,861,973 8/1989 Hellekson et al....235/467--.

under "FOREIGN PATENT DOCUMENTS"

insert: -- 64-48017 2/1989 Japan --.

Signed and Sealed this

Eleventh Day of October, 1994

*Attest:*

BRUCE LEHMAN

*Attesting Officer*      *Commissioner of Patents and Trademarks*